United States Patent [19]

Sato

[11] Patent Number: 5,134,528
[45] Date of Patent: Jul. 28, 1992

[54] LOW FREQUENCY COMPONENT RESTORATION CIRCUIT FOR RESTORING AND COMPENSATING FOR A LOW FREQUENCY COMPONENT LOST IN A DIGITAL SIGNAL TRANSMISSION SYSTEM

[75] Inventor: Kenichi Sato, Osaka, Japan

[73] Assignee: Sanyo Electric Co., Ltd., Osaka, Japan

[21] Appl. No.: 508,613

[22] Filed: Apr. 13, 1990

[30] Foreign Application Priority Data

Apr. 19, 1989 [JP] Japan .................................. 1-99553

[51] Int. Cl.<sup>5</sup> ........................... G11B 5/09; G11B 5/02
[52] U.S. Cl. ........................................ 360/46; 360/67
[58] Field of Search ................... 360/46, 67; 307/359, 307/520, 521, 556, 522, 264; 328/104, 152, 164; 330/9; 369/49

[56] References Cited

U.S. PATENT DOCUMENTS

| | | | |
|---|---|---|---|
| 3,264,569 | 8/1966 | Lefferts | 330/9 |
| 4,692,914 | 9/1987 | Yasumura et al. | 369/49 |
| 4,786,986 | 11/1988 | Yamanushi et al. | 360/33.1 |
| 4,942,485 | 7/1990 | Umehara et al. | 360/46 |
| 4,991,034 | 2/1991 | Sato | 360/67 |

FOREIGN PATENT DOCUMENTS 129975 7/1985 Japan .
123064 6/1986 Japan .

*Primary Examiner*—Vincent P. Canney
*Assistant Examiner*—Won Tae C. Kim
*Attorney, Agent, or Firm*—Armstrong, Nikaido, Marmelstein, Kubovcik & Murray

[57] ABSTRACT

A low frequency component restoration circuit of a digital VTR restores cut off low frequency component of a reproduced digital signal. The low frequency component restoration circuit includes a first low frequency compensation path for performing feed-back low frequency compensation to an input digital signal and a second low frequency compensation path for performing low frequency compensation to the input digital signal, and wherein an output of the first low frequency compensation path is selectively supplied when a normal reproduction mode is selected where the amplitude of the input digital signal wanders slightly, and an output of the second low frequency compensation path is selectively supplied when a special reproduction mode is selected where an amplitude of the input digital signal greatly wanders in a short time period.

9 Claims, 5 Drawing Sheets

LOW FREQUENCY COMPONENT RESTORATION CIRCUIT FOR RESTORING AND COMPENSATING FOR A LOW FREQUENCY COMPONENT LOST IN A DIGITAL SIGNAL TRANSMISSION SYSTEM

BACKGROUND OF THE INVENTION

1. Field of the Invention

The present invention relates generally to low frequency component restoration circuits, and more particularly, to a low frequency component restoration circuit for restoring and compensating for a low frequency component of a digital signal when the low frequency component, including direct current, is lost in a digital signal transmission, recording or reproducing system such as a digital video tape recorder (referred to as digital VTR, hereinafter).

2. Description of the Background Art

Conventionally, a binary (0, 1 or +1, −1) digital signal such as an NRZ (Non-Return-to-Zero) signal comprises a low frequency component including a direct current component. FIG. 1 is a diagram showing frequency characteristics of such a digital signal, where the axis of abscissa represents a relative frequency and the axis of ordinate represents a relative level. In FIG. 1, a solid line represents frequency characteristics of the above described digital signal comprising a low frequency component. In transmitting, recording or reproducing the digital signal, a signal component in the low frequency region, which is represented by a broken line, may be cut off for the following reasons.

More specifically, in case of signal transmission through, for example, a transmission path, the transmission of a digital signal and the supply of power may be simultaneously made using a pair of signal lines. In such a case, a low frequency component in the digital signal may be cut off to transmit a signal having a frequency component higher than a given value, and a low frequency region including a DC (Direct Current) region may be allocated to the supply of power.

In addition, in case of recording and reproducing of the digital signal of, for example, a VTR, the low frequency component of the digital signal is lost due to differential response characteristics of a magnetic head.

As described in the foregoing, when the low frequency region of the digital signal is cut off, a base line of the digital signal wanders. Such a wandering of a base line is called "base line wandering".

FIG. 2 is a waveform diagram showing a digital signal having its base line wandering, where a solid line represents a waveform of the digital signal and a dot and dash line represents the base line thereof. If and when the base line wanders as shown in FIG. 2, it becomes difficult to precisely determine whether the digital signal is at a high level or a low level on a receiving or reproducing side of the digital signal. As a result, the possibility is increased that a code error occurs.

Therefore, conventionally, on the receiving or reproducing side of the digital signal, a DC restoration circuit employing a so-called quantized feedback method is utilized in order to compensate for the low frequency component which is lost in the digital signal as described above. Such a DC restoration circuit is disclosed in, for example, Japanese Patent Laying-Open No. 60-129975.

FIG. 3 is a schematic block diagram showing one example of such a conventional DC restoration circuit, and FIG. 4 is a diagram showing frequency characteristics of the circuit shown in FIG. 3. In FIG. 4, the axis of abscissa represents a relative frequency and the axis of ordinate represents a relative level, as in FIG. 1.

In FIG. 3, a digital signal having a frequency component represented by a solid line of FIG. 4 is input to an input terminal 1 from a predetermined transmission or reproducing system (for example, a magnetic head of a digital VTR). This digital signal corresponds to a signal having its low frequency region, represented by the broken line of FIG. 1, cut off, out of the inherent frequency component represented by the solid line of FIG. 1 from the above described various causes. This digital signal is supplied to one input terminal 3 of an adder 2. In addition, an output terminal 4 of the adder 2 is connected to an input of a data determination circuit 5. This determination circuit 5 performs processing such a waveform-shaping and data detection with respect to an inputted signal. A data signal "1" or "0" is output from an output terminal 8. Described in more detail, this data determination circuit 5 is constituted such that a timing clock is extracted from the input digital signal and the input digital signal is latched by the extracted timing clock to take out a binary signal "0" or "1". Out of thus output data signal, a low frequency component extracted by a low-pass filter (LPF) 6 is supplied to the other input terminal 7 of the adder 2 as a feedback signal. It is assumed that pass characteristics of the LPF 6 are set to be approximately equal to low frequency cut-off characteristics of the digital signal supplied to the input terminal 1. As a broken line in FIG. 4 is extracted from the LPF 6 and added to the input signal by the adder 2, so that the lost low frequency component in the input digital signal is restored.

Meanwhile in the conventional DC1restoration circuit as shown in FIG. 3, the feedback value from the LPF 6 is always constant. Accordingly, in the case of recording and reproducing of the digital signal in, for example, the digital VTR, if the amplitude of the input digital signal wanders due to spacing loss, drop out or the like, a balance between a compensation signal from the LPF 6 and a signal to be compensated from the input terminal 1 is destroyed because the feedback value is constant as described above, so that stable compensation for a low frequency component cannot be made.

FIG. 5 is a diagram showing one example of a DC restoration circuit proposed to solve such a problem, which is disclosed in, for example, Japanese Patent Laying-Open No. 61-123064. The DC restoration circuit shown in FIG. 5 is the same as that shown in FIG. 3 except for the following. Namely, a variable gain amplifier 9 is provided between an LPF 6 and an input terminal 7 of an adder 2. In addition, there is provided a level detector 10 for detecting a level of a signal input to an input terminal 1. More specifically, this level detector 10 has a function of rectifying and further smoothing the input signal. The gain of the variable gain amplifier 9, i.e., the feedback value from the LPF 6 is controlled by a control signal from the level detector 10. More specifically, in the DC restoration circuit shown in FIG. 5, the feedback value is controlled corresponding to a level of the input digital signal, so that stable compensation for a low frequency component can be made. FIG. 6 is a waveform diagram showing one example of an input signal of the DC restoration circuit of FIG. 5. Described in more detail, FIG. 6 (a) represents a normal level wandering of an input signal, for example, a relatively moderate level wandering caused in every scan period of a rotary magnetic head, i.e., every one field, in a digital VTR. Such a moderate level wandering is caused due to error of a tracking, difference in touching of a tape to a head (head touch) when the rotary magnetic head starts coming in contact with a magnetic tape and leaving the same. In the DC restoration circuit shown in FIG. 5, since the feedback value is controlled in accordance with the level wandering of the entire input signal, as described above, the level detector 10 fully follows a level wandering to precisely control the feedback value of the compensation signal in the case of a moderate level wandering as shown in FIG. 6 (a).

On the contrary, FIG. 6 (b) represents an abrupt level wandering of an input signal caused in a very short period, wherein tape travelling speeds in recording and reproducing differ from each other such as in a high speed search or the like and a rotary magnetic head traverses a plurality of tracks in one scan period to reproduce a signal. In such a case, in the DC restoration circuit of FIG. 5, the level detector 10 cannot follow the abrupt level wandering to cause time delay, resulting in a large error between the compensation signals of the low frequency component. Therefore, in order to make the level detector 10 easily follow the level wandering, a time constant of the level detector should be made smaller However, it is difficult because of waveform distortion, restriction of stability of the system or the like.

In addition, as described above, while the data determination circuit 5 generates a compensation signal based on a digital signal obtained by retiming an input signal by a timing clock extracted from the signal, an amplitude of the input digital signal shown in FIG. 6 (b) becomes zero at a certain point where a phase lock of a PLL circuit (not shown) in the determination circuit 5 for extracting timing clock is unlocked, so that a large error might be caused in the compensation signal during the period where the phase lock is unlocked.

SUMMARY OF THE INVENTION

Therefore, an object of the present invention is to provide a low frequency component restoration circuit capable of fully compensating for a low frequency component of an input digital signal irrespective of wandering of a base line of the input signal.

Another object of the present invention is to provide a low frequency component restoration circuit capable of fully compensating for a low frequency component of an input digital signal even if an abrupt level wandering is caused in an input signal in a very short period.

Briefly state, the present invention is a low frequency component restoration circuit for compensating for a low frequency component of a digital signal, which comprises an input terminal receiving an amplitude variable digital signal having its low frequency component cut off, a first low frequency compensation path for performing a quantized feedback type low frequency compensation to the digital signal received by the input terminal, a second low frequency compensation path for performing an integration type low frequency compensation to the digital signal received by the input terminal, and a circuit for selecting either first or second low frequency compensation path in accordance with the degree of wandering of the amplitude of the digital signal.

Therefore, a principal advantage of the present invention is that low frequency of a reproduced signal can be precisely compensated by switching the types of operations of the low frequency compensation in accordance with the degree of wandering of the amplitude of the inputted signal, irrespective of the degree of the level wandering of the reproduced signal.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
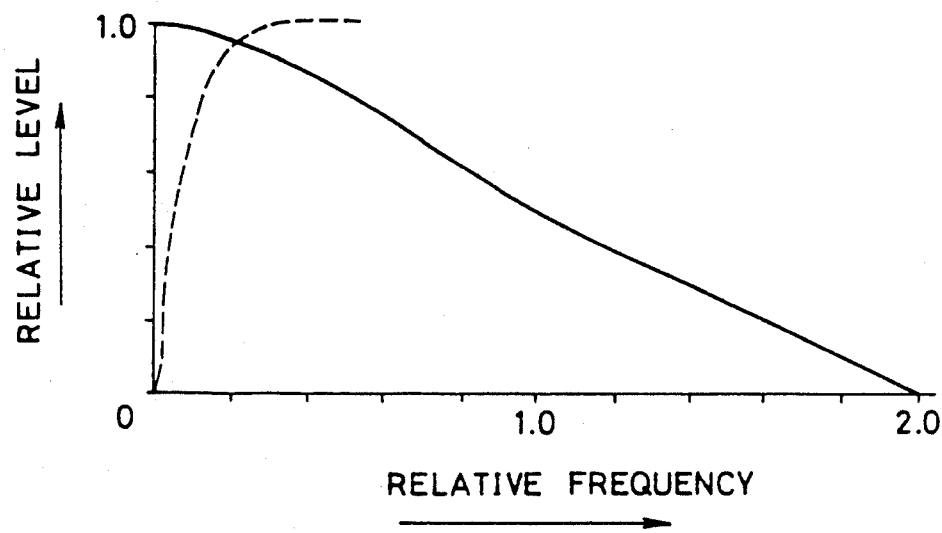
FIG. 1 is a diagram showing frequency characteristics of a digital signal supplied to a direct current restoration circuit.
Figure 2:
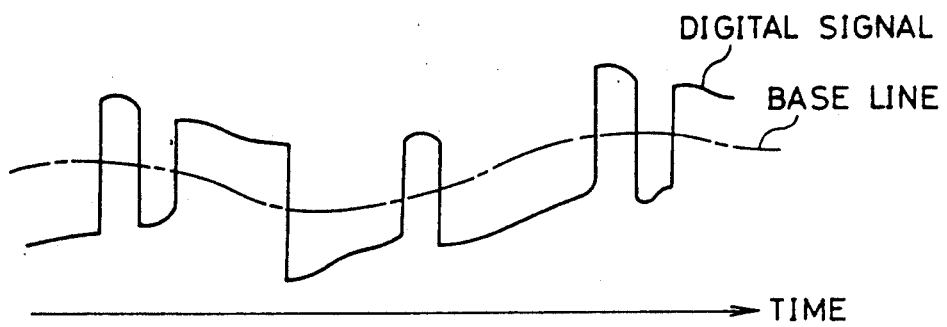
FIG. 2 is a waveform diagram showing a digital signal having its base line wanders.
Figure 3:
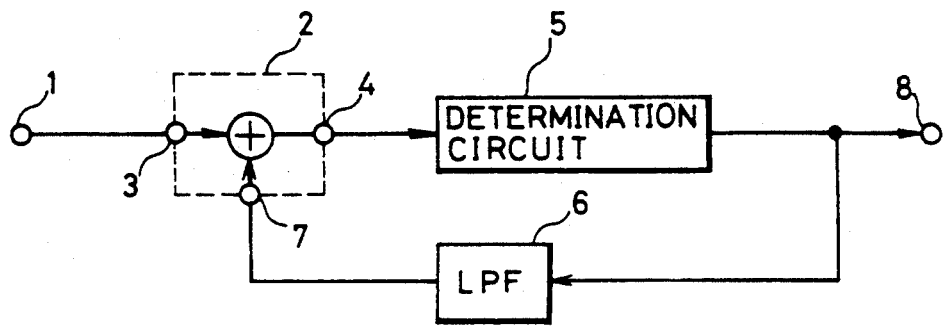
FIG. 3 is a schematic block diagram showing one example of a conventional DC restoration circuit.
Figure 4:
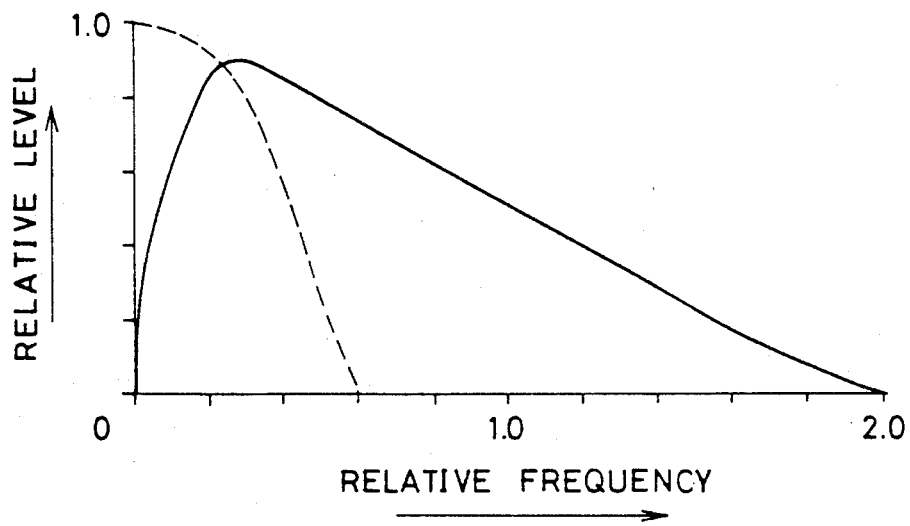
FIG. 4 is a diagram showing frequency characteristics of the circuit of FIG. 3.
Figure 5:
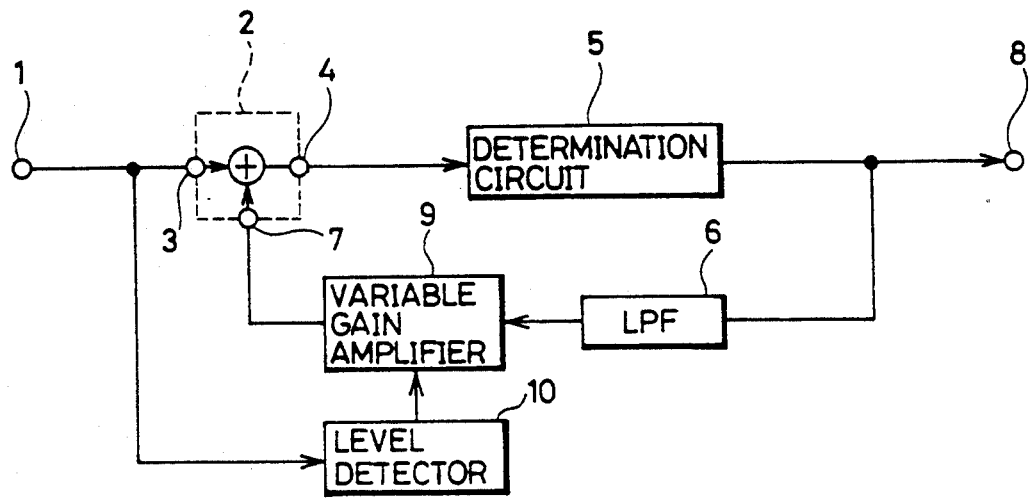
FIG. 5 is a schematic block diagram showing another example of a conventional DC restoration circuit.
Figure 6A:
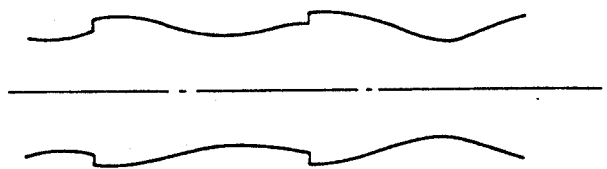
FIGS. 6(a)–6(b) are waveform diagrams for explaining a problem concerning the circuit shown in FIG. 5.
Figure 6B:
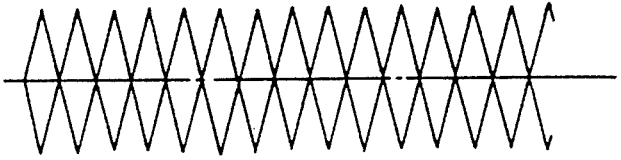
Figure 7:
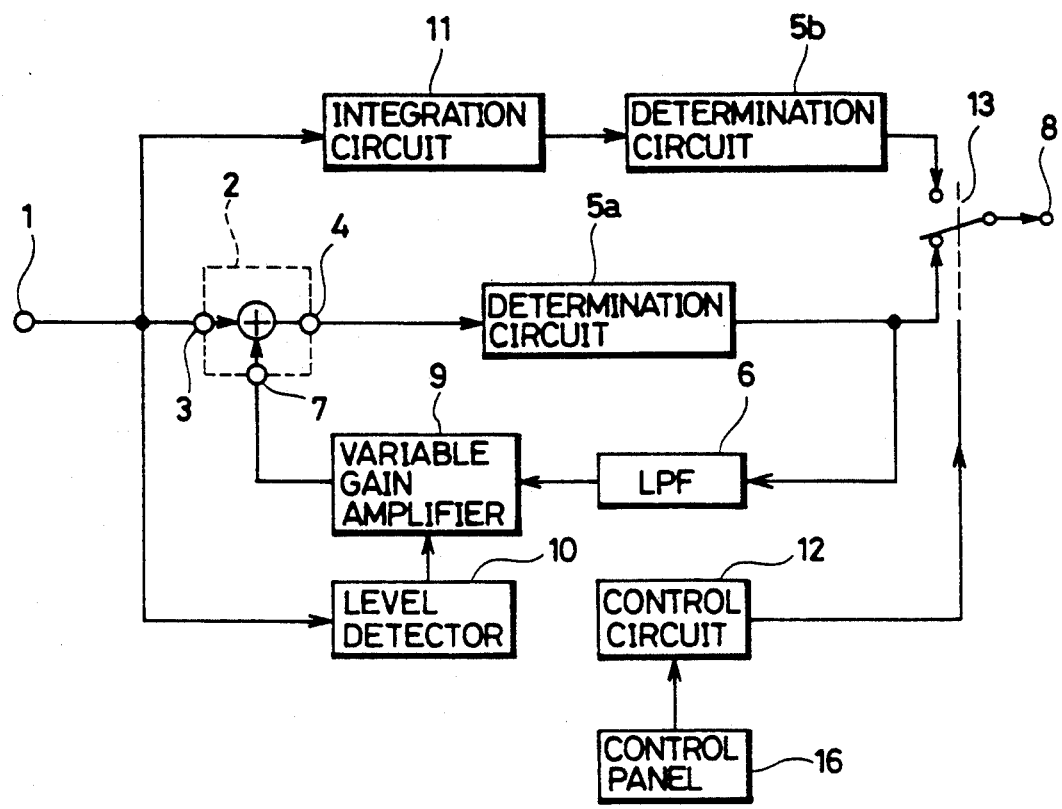
FIG. 7 is a schematic block diagram showing a low frequency component restoration circuit according to a first embodiment of the present invention.

FIG. 7 is the schematic block diagram showing the low frequency component restoration circuit according to the first embodiment of the present invention. The embodiment shown in FIG. 7 is a low frequency component restoration circuit for receiving a signal reproduced by, for example, a rotary head of a digital VTR or the like and waveform-shaped in a predetermined manner to restore a low frequency component, and which circuit is the same as the conventional circuit shown in FIG. 5 except for the following. Namely, in the low frequency component restoration circuit shown in FIG. 7, there are provided a known feed-forward type low frequency compensation circuit, that is, an integration type low frequency boost circuit (referred to as a second low frequency compensation path, hereinafter) comprising an integrator 11 and a second data determination circuit 5b, in addition to a conventional feedback type DC restoration circuit (referred to as a first low frequency compensation path, hereinafter) comprising an adder 2, a first data determination circuit 5a, an LPF 6, a variable gain amplifier 9 and a level detector 10. A switch 13, in response to a control signal from a control circuit 12, selects either output of the determination circuits 5a and 5b to supply the selected output through an output terminal 8. The selection by this switch 13 is made corresponding to the selection of a reproduction mode (for example, either a normal reproduction or a special reproduction) of a restoration, device by the operation of a control panel 16 by a user. More specifically, the switch 13 is controlled such that when a level wanders moderately such as in a normal reproduction (FIG. 6(a)), an output of the first low frequency compensation path is selected, and on the other hand when a level wanders greatly in a short time period such as in a high speed search or the like (FIG. 6 (b)), an output of the second low frequency compensation path is selected.

Figure 8:
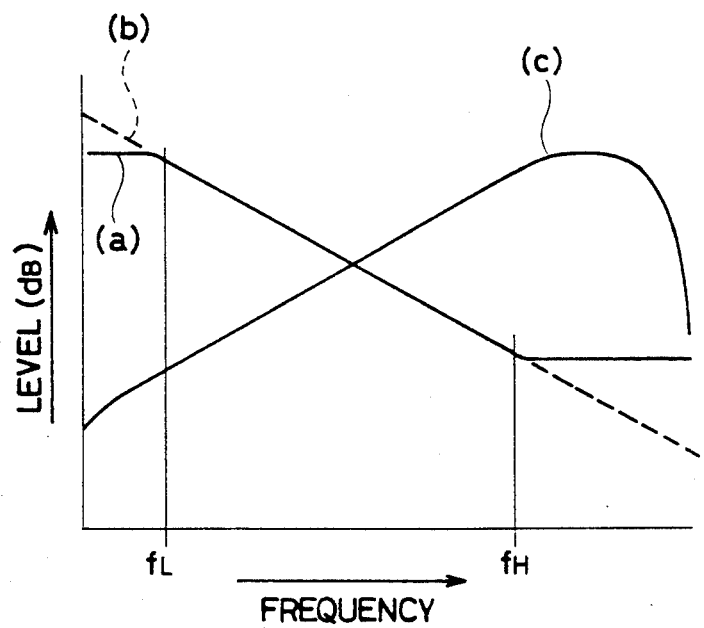
FIG. 8 is a graph for explaining an operation of the low frequency component restoration circuit shown in FIG. 7.

Now it is assumed that the integrator 11 of FIG. 7 has characteristics represented by a curve (a) of FIG. 8. In addition, a curve (c) of FIG. 8 represents frequency characteristics in a magnetic reproducing system of a VTR. Noting the frequency characteristics (c), the curve (c) starts declining in a frequency region higher than a frequency $f_H$ at a turning point of the frequency $f_H$ in a high frequency region. Such a decline is caused due to spacing loss in reproducing signals on a tape or the like. In order to compensate for such a decline, integration characteristics (a) of the integrator 11 are made to disappear at the pole frequency $f_H$ and become flat in a frequency region higher than $f_H$, with respect to perfect integration characteristics (b) (transfer function $G(S) = 1/S$; S is complex variable frequency). In addition, noting the low frequency region, because of the restriction on a circuit structure of the integration circuit 11, it is difficult to achieve a perfect integration characteristic, as indicated by the broken line (b), in the low frequency. In addition, such perfect characteristics are undesirable in consideration of the noise frequency distribution in reproducing signals on a tape. As a result, the characteristics (a) is made flat in the region lower than $f_L$ with the frequency $f_L$ as a pole.

Accordingly, when a normal reproduction mode is designated by a user, the above described first low frequency compensation path is selected, a low frequency component of a digital signal determined and restored by the data determination circuit 5a is extracted by the LPF 6, feedback as a compensation signal to a signal to be determined and restored and then added thereto by the adder 2. Thus, the quantized feedback type low frequency compensation is performed in accordance with an amplitude wandering of the reproduced signal. On the other hand, when a special reproduction mode is designated, the above described second low frequency compensation path is selected and an input signal is integrated by the characteristics of FIG. 8 (a), in order to boost a low frequency of the input signal, and thereafter it is determined and restored by the determination circuit 5b. As the foregoing, according to the first embodiment shown in FIG. 7, low frequency of a reproduced digital signal can be compensated for quickly and precisely in accordance with a selected reproduction mode.

Figure 9:
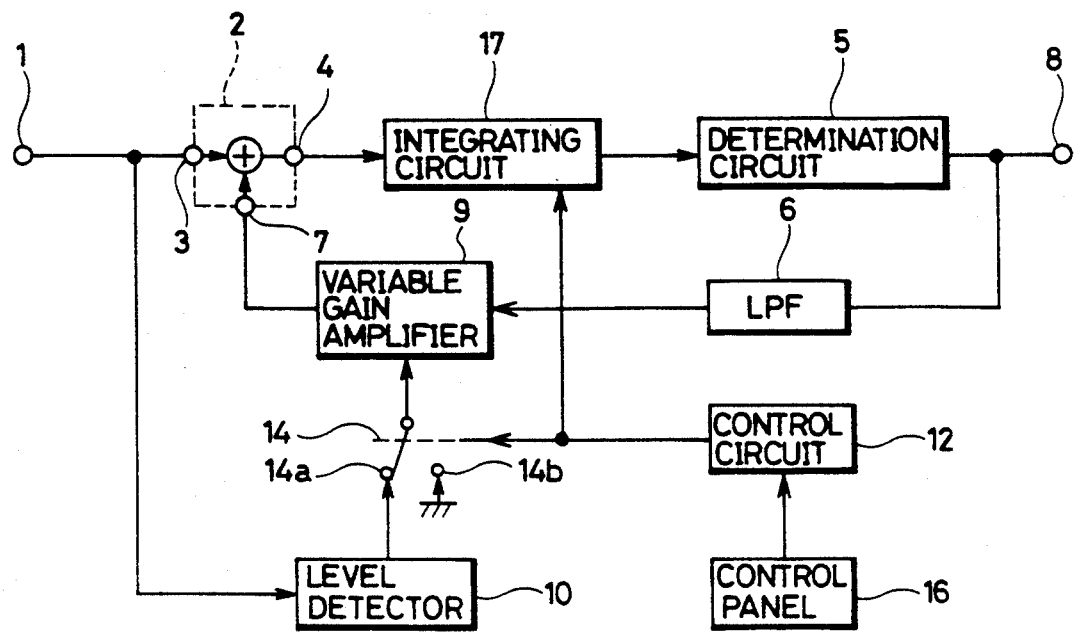
FIG. 9 is a schematic block diagram showing a low frequency component restoration circuit according to a second embodiment of the present invention.

FIG. 9 is a schematic block diagram showing the low frequency component restoration circuit according to the second embodiment of the present invention. The embodiment shown in FIG. 9 is the same as the above described embodiment shown in FIG. 7 except for the following. Namely, in the embodiment of FIG. 9, unlike the above described embodiment of FIG. 7, first and second low frequency compensation paths are not provided separately but the determination circuit 5 is used in common in each restoration mode. Then, it is structured such that characteristics of the integrator 17 are changed in accordance with a selected reproduction mode and the variable gain amplifier 9 is selectively operated.

Described in more detail, a switch 14 is switched to either a terminal 14a or 14b in accordance with a control signal from the control circuit 12, wherein the selection by the switch 14 is made corresponding to a selection of a reproduction mode through an operation of a control panel 16 by a user. More specifically, when a level wanders moderately (FIG. 6 (a)) such as in a normal reproduction, the integrator 17 does not operate as an integrator but operates as an amplifier having flat frequency characteristics, and the switch 14 is switched to the terminal 14a side, so that the variable gain amplifier 9 changes its gain in response to a detection output of the level detector 10. Namely, when the normal reproduction mode is selected, the above described first low frequency compensation path is achieved by the integrator 17, determination circuit 5, the LPF 6, the variable gain amplifier 9 and the level detector 10, so that the quantized feedback type low frequency compensation operation is performed. On the other hand, when the level wanders greatly in a short time period (FIG. 6 (b)) as in the high speed reproduction, the integrator 17 functions as an integrator having the characteristics shown in FIG. 8 (a) and the switch 14 is switched to the terminal 14b side, so that the feedback gain becomes zero, and consequently the feedback value of the compensation signal becomes zero. In other words, when the special reproduction mode is selected, the above described second low frequency compensation path is achieved by the integrator 17 and the determination circuit 5 to perform an integration type low frequency compensation. Accordingly, the second embodiment also enables quick and precise low frequency compensation of a reproduced digital signal in accordance with a selected reproduction mode.

Figure 10:
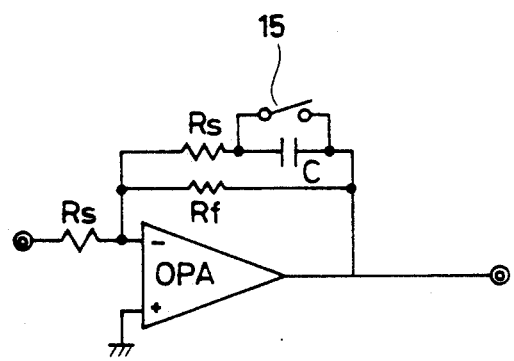
FIGS. 10 and 11 are circuit diagrams showing modified examples of the characteristic variable integrator shown in FIG. 9.
Figure 11:
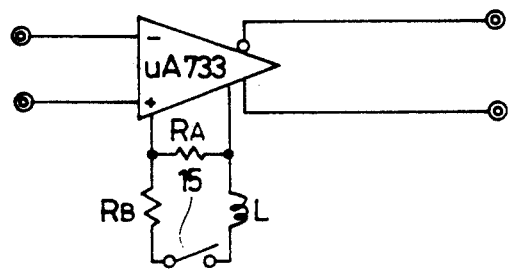

FIGS. 10 and 11 are circuit diagrams showing examples of the characteristic variable integrator 17 shown in FIG. 9, where FIG. 10 represents a single-ended type integrator using an operational amplifier and FIG. 11 represents a differential type integrator using a general-purpose differential amplifier ($\mu$A773 or the like). In FIGS. 10 and 11, the switch 15 is controlled by a control signal from the control circuit 12, where in FIG. 10 the integration characteristics shown in FIG. 8 are achieved when the switch 15 is turned off, and in FIG. 11 the integration characteristics shown in FIG. 8 are achieved when the switch 15 is turned on.

As the foregoing, according to the present invention, quantized feedback type low frequency compensation and integration type low frequency compensation are switched from each other in accordance with a selected reproduction mode, so that precise low frequency compensation of a reproduced signal can be performed irrespective of the degree of the level wandering of the reproduced signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A low frequency component restoration circuit for compensating for a low frequency component of a digital signal, comprising:

input means for receiving an amplitude variable digital signal having a low frequency component cut off;

first low frequency compensating means for performing feed-back low frequency compensation for a first amount of change over time of a signal level of said digital signal received by said input means;

second low frequency compensating means for performing low frequency compensation for a second amount of change over time of said signal level of said digital signal which is larger than said first amount of change received by said input means; and selecting means for selectively supplying either output signal of said first and second low frequency compensating means in accordance with said amount of change of said signal level of said digital signal.

2. A low frequency component restoration circuit according to claim 1, wherein said first low frequency compensating means comprises:

adding means, having a first input terminal for receiving said digital signal received by said input means, a second input terminal and an output terminal, first data determining means for receiving an output from the output terminal of said adding means and for extracting a timing of said digital signal, filtering means for receiving an output of said first data determining means and for extracting a low frequency component from said output, variable gain amplifying means having a control terminal, said variable gain amplifying means for amplifying said extracted low frequency component by changing gain in response to said signal level supplied to said control terminal and for supplying the amplified low frequency component to the second input terminal of said adding means, and level detecting means for detecting said signal level of said digital signal received by said input means and for supplying said signal level to the control terminal of said variable gain amplifying means, said second low frequency compensating means comprises:

integrating means for integrating said digital signal received by said input means, and second data determining means for receiving an output of said integrating means and for extracting a timing of said digital signal.

3. A low frequency component restoration circuit according to claim 2, wherein said selecting means comprises:

a control circuit, responsive to selection of a reproduction/transmission system of said input digital signal, for generating a control signal, and switching means, responsive to said control signal, for selecting either output of said first and second data determining means.

4. A low frequency component restoration circuit according to claim 3, wherein said control circuit applied a signal for selecting an output of said first data determining means to said switching means when said amount of change of signal level of said digital signal to be input changes moderately and, said control circuit supplies a signal for sleeting an output of said second data determining means to said switching means when said amount of change of signal level of said digital signal to be input changes abruptly.

5. A low frequency component restoration circuit according to claim 2, wherein pass characteristics of said filtering means are approximately equal to cut-off characteristics of a low frequency component of said digital signal.

6. A low frequency component restoration circuit according to claim 2, wherein said integrating means has characteristics for compensating for deterioration of frequency characteristics of reproduction/transmission system of said digital signal to be inputted.

7. A low frequency component restoration circuit according to claim 1, wherein said first low frequency compensating means comprises:

adding means having a first input terminal for receiving said digital signal received by said input means, a second input terminal and an output terminal, integrating means having a control terminal, said integrating means for integrating an output of the output terminal of said adding means by integration characteristics changing in response to said signal level supplied to said control terminal, data determining means for extracting a timing of an output of said integrating means, filtering means, responsive to an output of said data determining means, for extracting a low frequency component, variable gain amplifying means having a control terminal, said variable gain amplifying means for amplifying said extracted low frequency component by changing gain in response to said signal level supplied to said control terminal and for supplying the amplified low frequency component to the second input terminal of said adding means, and level detecting means for detecting said signal level of said digital signal received by said input means and for supplying said signal level to the control terminal of said variable gain amplifying means, said second low frequency compensating means comprises:

integrating means, and said data determining means, wherein said selecting means comprises:

a control circuit, responsive to selection of a reproduction/transmission system of said digital signal to be input, for generating a control signal, and switching means, responsive to said control signal, for switching the gain of said variable gain amplifier to "0", and wherein the integration characteristics of said integrating means changes in accordance with said control signal.

8. A low frequency component restoration circuit according to claim 7, wherein said control circuit controls said switching means such that an output of said level detecting means is supplied to the control terminal of said variable gain amplifying means and generates a control signal for switching the integration characteristics of said integrating means to flat frequency characteristics when said amount of change of said signal level of said digital signal to be input changes moderately, and said control circuit controls said switching means such that the gain of said variable gain amplifying means becomes "0" and generates a control signal for switching the integration characteristics of said integrating means to the characteristics for compensating deterioration of the frequency characteristics of reproduction/transmission system of said digital signal to be input when said amount of change of said signal level of said digital signal to be input changes abruptly.

9. A low frequency component restoration circuit according to claim 7, wherein
pass characteristics of said filtering means are approximately equal to cut-off characteristics of a low frequency component of said digital signal.

* * * * *